US006835040B2

(12) United States Patent
Quiring

(10) Patent No.: US 6,835,040 B2
(45) Date of Patent: Dec. 28, 2004

(54) LASER CUTTING PLATE CONVEYOR

(76) Inventor: Neil Quiring, 216 Prince Albert, Kingsville, Ontario (CA), N9V 1J7

( * ) Notice: Subject to any disclaimer, the term of this patent is extended or adjusted under 35 U.S.C. 154(b) by 0 days.

(21) Appl. No.: 10/290,894

(22) Filed: Nov. 8, 2002

(65) Prior Publication Data

US 2003/0091423 A1 May 15, 2003

Related U.S. Application Data

(60) Provisional application No. 60/345,498, filed on Nov. 9, 2001.

(51) Int. Cl.[7] ................................................ B65G 1/00
(52) U.S. Cl. .................... 414/281; 414/660; 414/752.1; 414/222.02; 414/222.12; 414/225.01
(58) Field of Search ................................ 414/281, 279, 414/627, 660, 749.1, 752.1, 222.02, 222.12, 225.01; 901/14, 16, 40; 198/468.6

(56) References Cited

U.S. PATENT DOCUMENTS

| | | | | |
|---|---|---|---|---|
| 3,982,642 A | * | 9/1976 | Muller | 414/268 |
| 4,005,786 A | * | 2/1977 | Adelson et al. | 414/281 |
| 4,587,716 A | | 5/1986 | Bytow | |
| 4,735,539 A | | 4/1988 | Hakkinen et al. | |
| 4,760,237 A | | 7/1988 | Mizukado et al. | |
| 4,969,791 A | * | 11/1990 | Stolzer | 414/281 |
| 5,121,539 A | | 6/1992 | Klingel | |
| 5,125,790 A | * | 6/1992 | Foulke et al. | 414/752.1 |
| 5,183,993 A | | 2/1993 | Sato et al. | |
| 5,192,848 A | | 3/1993 | Miyakawa et al. | |
| 5,254,068 A | | 10/1993 | Yamada et al. | |
| 5,310,396 A | | 5/1994 | Momoi et al. | |
| 5,358,375 A | * | 10/1994 | Kawada et al. | 414/277 |
| 5,957,305 A | * | 9/1999 | Takahashi | 209/573 |
| 6,413,035 B1 | * | 7/2002 | Kaneko | 414/796.9 |
| 6,574,857 B1 | * | 6/2003 | Pajonk et al. | 29/740 |
| 6,692,210 B1 | * | 2/2004 | Ettelbruck | 414/222.01 |

* cited by examiner

*Primary Examiner*—Douglas Hess
(74) *Attorney, Agent, or Firm*—Young & Basile, P.C.

(57) ABSTRACT

An overhead conveyor system transports a selectable workpiece from vertically extending storage racks having a plurality of horizontally extending shelves with stationary stacks of workpieces to be processed on each shelf. Each shelf includes horizontally spaced shelf support members defining openings complementary to horizontally extending support members of a carriage. The horizontally extending members of the carriage are insertable between adjacent horizontally spaced shelf members to engage the upper most workpiece supported by the shelf located below the horizontally extending support members of the carriage. Workpiece engaging members operably associate or engage the upper-most workpiece with the carriage for movement vertically and horizontally along the path of travel to a workstation for processing.

20 Claims, 3 Drawing Sheets

LASER CUTTING PLATE CONVEYOR

CROSS-REFERENCE TO RELATED APPLICATIONS

This application is a continuation of provisional application Ser. No. 60/345,498 filed on Nov. 9, 2001.

FIELD OF THE INVENTION

The present invention relates to a storage and retrieval system capable of horizontal and vertical movement components to operably engage relatively large planar sheets of material from a plurality of vertically spaced storage locations for delivery to one or more workstations, such as a laser cutting workstation.

BACKGROUND OF THE INVENTION

Laser cutting workstations come in a variety of styles, sizes, and shapes from a wide variety of commercial manufacturers. Each laser machining cell is typically supplied with a stream of workpieces to be processed by a conveyor system. Typical conveyor systems for laser machining workstations can be seen in U.S. Pat. Nos. 5,192,848; 5,310,396; 5,121,539; 4,735,539; and commercially available units are manufactured by Trumpf GmbH & Co, Ditzingen, of the Federal Republic of Germany.

Most of these configurations require complicated shuttle systems to move parts from vertical spaced storage locations to a ready position to be engaged by the conveyor system, since the conveyor system is incapable of operably engaging and removing the workpieces from the vertical storage locations directly.

SUMMARY OF THE INVENTION

It would be desirable in the present invention to provide a workpiece conveyor system capable of operably directly engaging relatively large planar workpieces within vertically extending spaced storage locations or racks, and for moving the workpieces or plates from the storage location to a workstation with a single conveyor system. It would be desirable in the present invention to eliminate the need for any intermediate shuttle or auxiliary movable elements to bring the workpieces into a ready position for attachment by the conveyor system. In other words, it would be desirable in the present invention to have the workpieces stored in a vertically extending spaced rack system where the storage location of each workpiece is a ready position that can be accessed directly by the conveyor system for operably engaging and moving the workpiece from the particular storage location to the workstation for processing.

A superstructure includes columns supporting an overhead runway system similar to a conventional bridge crane structure. The shelving is constructed in a manner that accommodates the carriage. The carriage arms are equally spaced to go in between the shelf supports. Once the carriage has been positioned into the shelf unit the carriage is then lowered down to the material. The suction cups that are attached to the carriage are then activated by a vacuum pump and attach themselves to the process sheets. The material being processed is raised, and then transferred to the laser bed. The trolley travels left or right to position the material over the laser bed. The sheet steel is then lowered onto the laser bed. A column on the trolley serves as a guide to raise and lower the carriage. The column stabilizes the carriage load; the column and carriage are offset from the trolley to evenly distribute the carried load. The carriage is raised and lowered by nylon and/or polyester straps that are rolled onto a drum. The carriage travels vertically to allow the hoist to access multiple shelves. Since the equipment travels on a runway system that is expandable, it is capable of supplying one or more lasers (or other processing machines).

The vacuum carriage goes into the shelves to retrieve sheets with other systems, sheets are transferred from the rack out to the carriage versus the carriage retrieving the sheets while in the rack. The carriage can access multiple shelves. The fixed shelves are spaced to accommodate the vacuum carriage. The carriage is raised and lowered via nylon, and/or polyester straps which are rolled onto a drum. Six (6) directions of travel, forward, backward, left, right, up and down are provided by the combination of the shuttle/trolley and carriage. A series of vacuum cups are used to hold the product (sheets) as it travels from the shelves to the laser bed. A remote control station controls the apparatus.

The runway is the superstructure that supports the bridge similar to a conventional overhead bridge crane superstructure. The bride is the structure that travels along the runway, and also supports the trolley. The trolley is the structure that travels horizontally along the bridge and supports the carriage. The carriage is the structure that travels vertically on the column of the trolley, which supports a series of vacuum cups. The vacuum cups are rubber type suction cups that adhere to any flat surface such as sheets of steel, glass, plastic, etc. The shelves are a series of sheet storage shelves where the raw material (sheets) are stored for processing.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DETAILED DESCRIPTION OF THE PREFERRED EMBODIMENT

Figure 1:
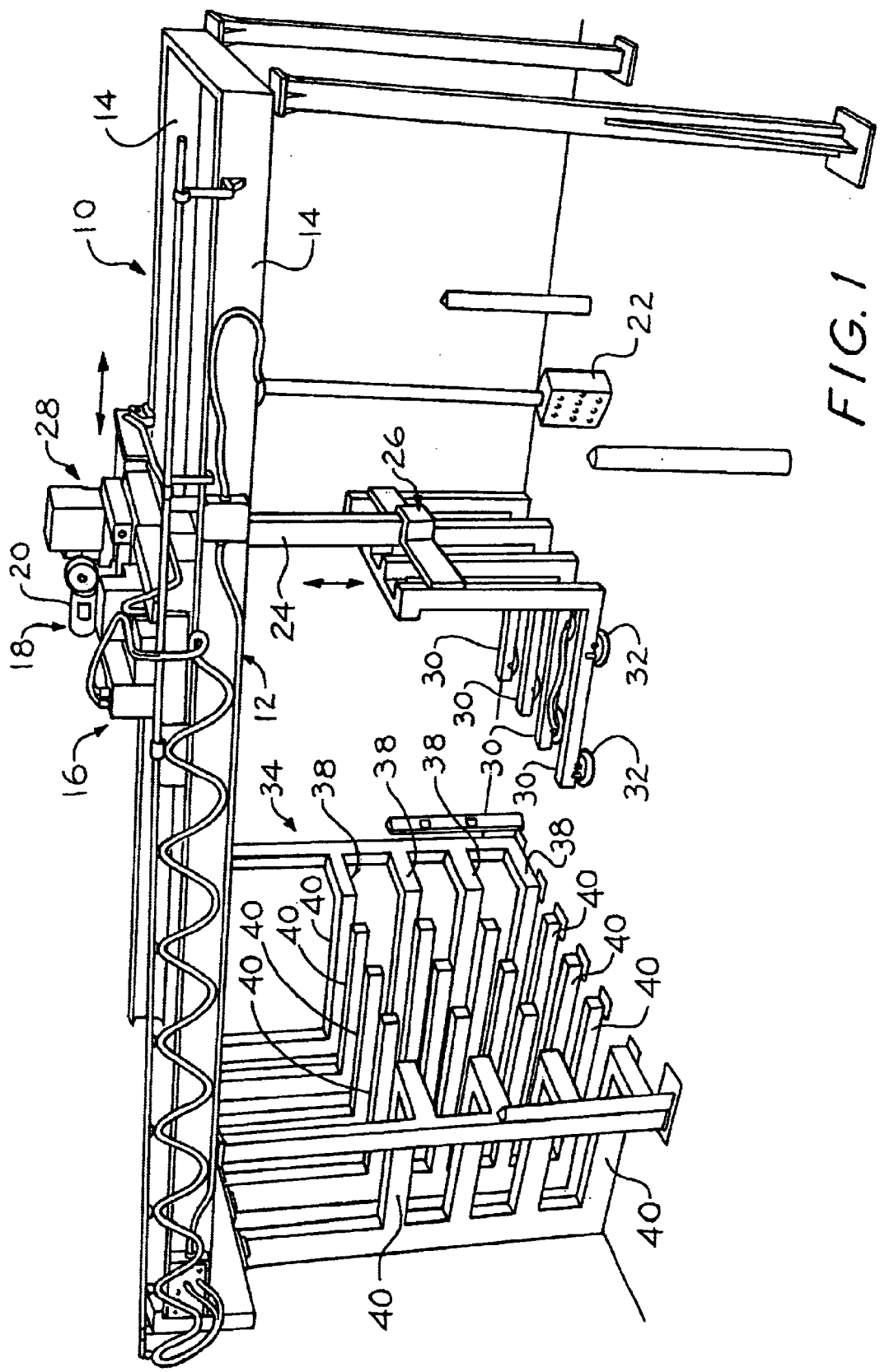
FIG. 1 is a perspective view of a conveyor according to the present invention.
Figure 2:
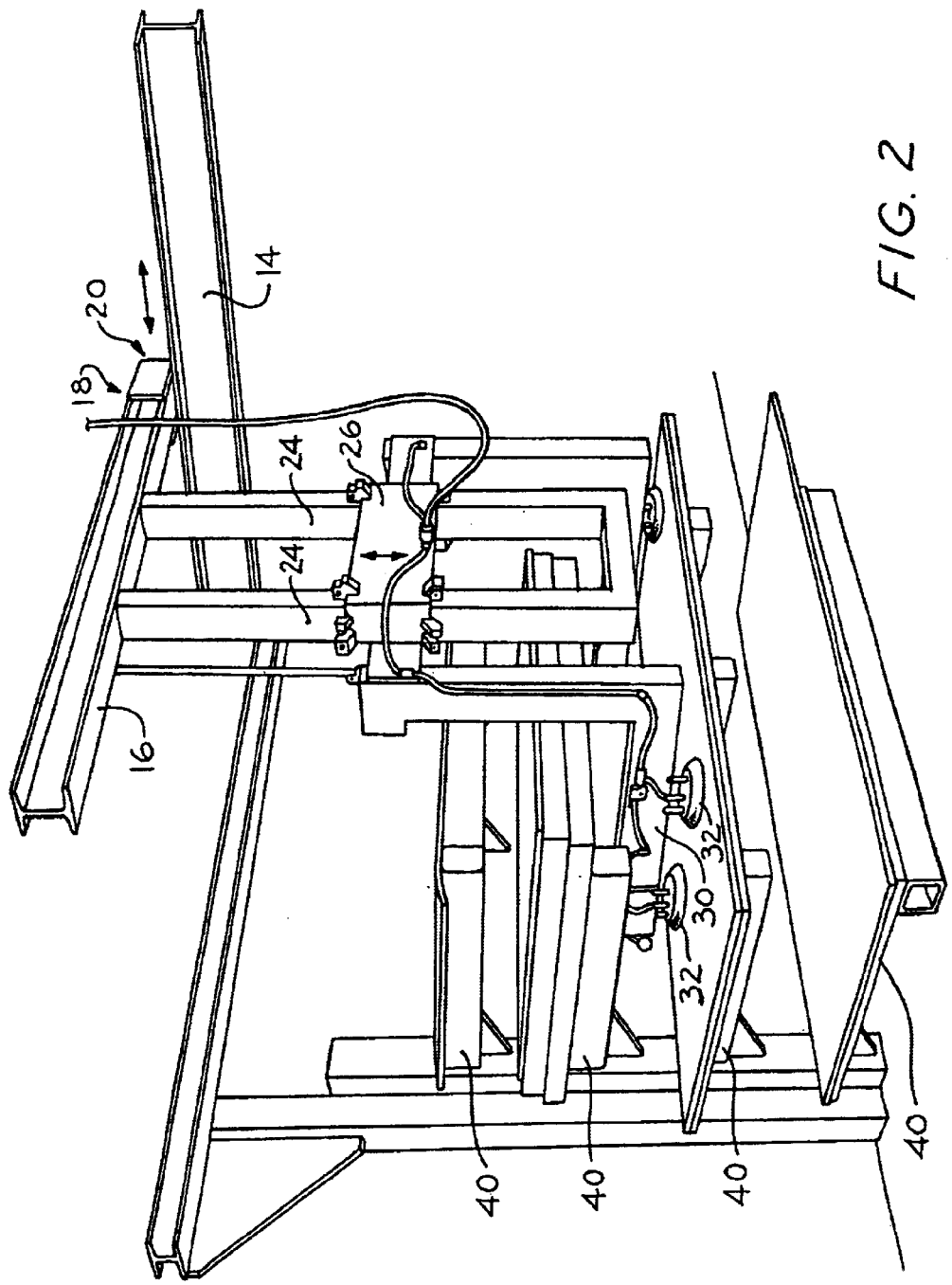
FIG. 2 is a perspective view of a photograph of a conveyor according to the present invention with the workpiece support members positioned within the vertically spaced storage system for retrieving a workpiece to be transported.
Figure 3:
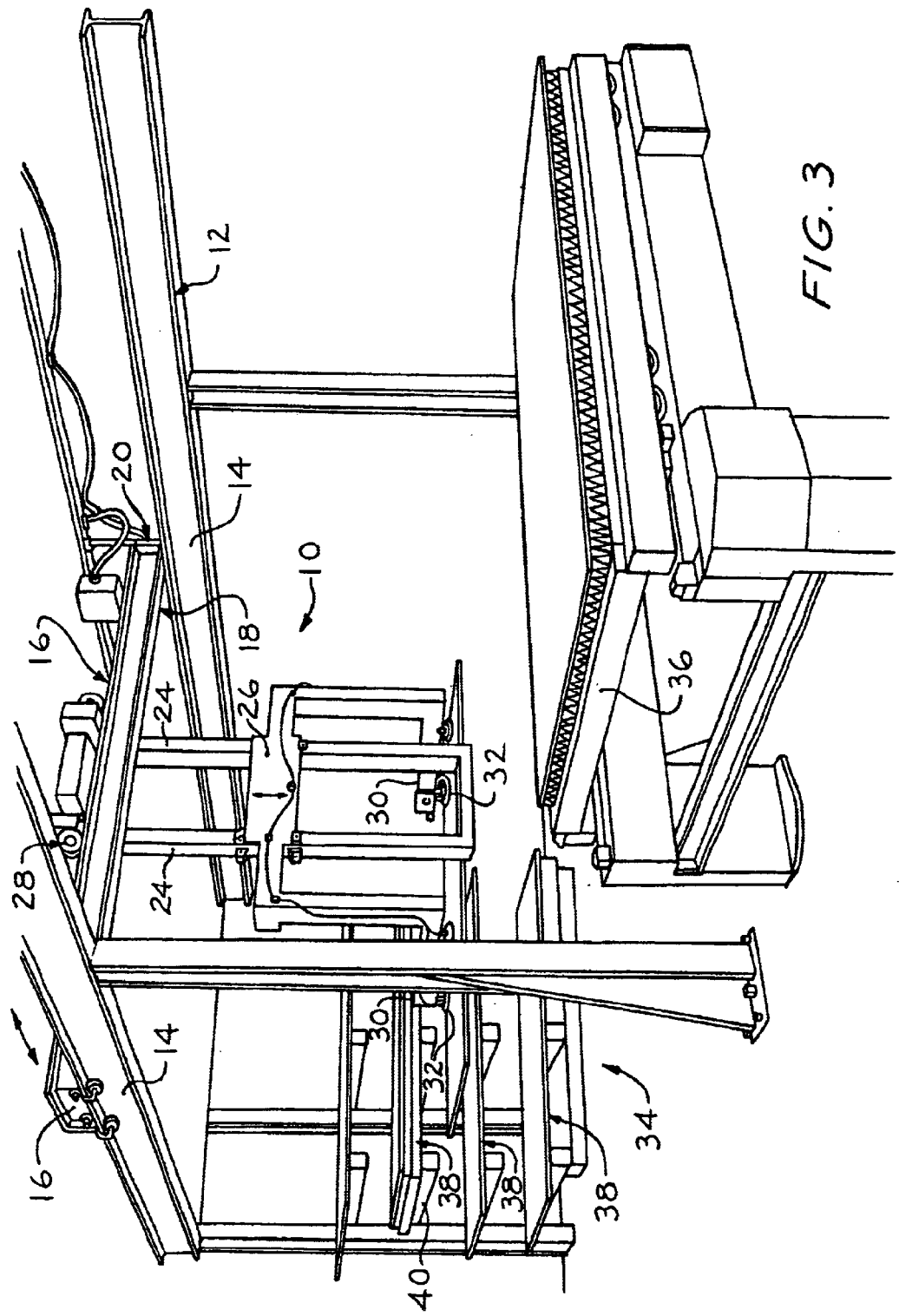
FIG. 3 is a close-up perspective view of the conveyor according to the present invention illustrated in FIG. 2 prior to attachment to the workpiece for transport.

Referring to FIGS. 1–3, a laser cutter plate conveyor 10 according to the present invention includes a frame structure 12. The frame structure 12 can include at least one, and preferably two spaced apart, horizontally extending frame members or rails 14. A trolley or shuttle 16 is supported on the frame members or rails 14 for movement along a fixed path of travel defined by the frame members or rails 14. Drive means 18 is provided operably connected to the shuttle 16 for moving the shuttle 16 between first and second end limits of travel along the horizontally extending frame member or rail 14. By way of example and limitation, the drive means 18 can include a reversible electric motor 20 for driving the shuttle 16 between the first and second end limits of travel along the fixed path defined by the horizontally extending frame member or rail 14. Control means 22 can be provided operably connected to the drive means 18 of the shuttle 16 for controlling movement of the shuttle 16 along the fixed path of travel defined by the horizontally extending frame member or rail 14. Appropriate signal generators, such as switches or sensors, can be provided as required along the fixed path of travel for indicating the location of the shuttle 16 as the shuttle 16 moves along the fixed path allowing the control means 22 to control the speed and the position of the shuttle 16 along the fixed path of travel for stopping at either the first or second end limit of travel, or any workstation defined in between the end limits of travel.

The shuttle 16 includes at least one vertically extending support member 24. A carriage 26 is supported for movement along the vertically extending support member 24. Lift means 28 is provided for moving the carriage 26 vertically along the vertically extending support member 24 between a lowest position and a highest position. The lift means 28 can include one or more nylon or polyester straps or belts extendable and retractable with respect to a drum or spool with a reversible drive motor controlled by the control means 22. Appropriate signal generators, such as sensors or switches, can be provided for identifying various vertical positions along the vertically extending support member 24 allowing the control means 22 to control the speed and position of the carriage 26 as the carriage 26 moves along the vertical path defined by the vertically extending support member 24. The carriage 26 can include a plurality of horizontally extending support members 30. A plurality of workpiece engaging members 32 are connected to the horizontally extending support members 30. The workpiece engaging members 32 can be of any known configuration suitable for lifting relatively large, heavy, metal plates. By way of example and not limitation, the workpiece engaging members 32 can include magnetic and/or vacuum suction cup forms of engagement members. The magnetic and/or vacuum actuation can be controlled in response to appropriate signals from the control means 22 in order to engage and lift a workpiece from the vertically extending storage rack 34 for movement along the fixed path of travel to the workpiece bed or support nest 36 of the laser cutting apparatus.

In the illustrated embodiment, the vertically extending storage rack 34 can be connected to and form part of the frame structure 12. The storage rack 34 can include a plurality of vertically spaced shelves 38. Each shelf 38 can support a vertical stack of workpieces to be processed as best seen in FIG. 3. Each shelf 38 is defined by a plurality of horizontally spaced shelf members 40. The horizontally shelf members 40 define openings in between one another at the ends facing the side of approach by the carriage and associated plurality of horizontally extending support members 30. The spacing defined by the horizontal shelf members 40 is complementary allowing entry of the horizontally extending support members 30 of the carriage 26 permitting direct engagement with the upper-most workpiece in the stack supported on that particular shelf as best seen in FIG. 3. This complementary configuration eliminates the need for additional shuttle units to move each individual plate from the storage location to a position accessible by the overhead conveyor system. In operation, the vertically extending storage rack 34 is loaded with workpieces to be processed. The shelves can support a stack of identical workpieces on each shelf, or each shelf can be allocated a workpiece of a particular material or thickness to be processed. The particular location of the workpiece to be processed can be programed into the control means 22. When the laser cutting apparatus calls for a new workpiece to be processed, the control means 22 determines the shelf location of the appropriate workpiece to be retrieved, and moves the carriage 26 to the appropriate elevation for entry above the shelf unit containing the workpiece to be retrieved. After the appropriate elevation of the carriage 26 has been set, or simultaneously while moving the carriage 26, the shuttle 16 can be activated to move from the present or current position toward the vertical storage rack 34. If necessary, the shuttle 16 can be stopped prior to entering into the vertical storage rack 34 if the carriage 26 has not reached the appropriate elevation for entry into the shelf holding the workpiece to be retrieved. When the carriage 26 is in the appropriate elevation to enter the shelf supporting the workpiece to be retrieved, the shuttle 16 continues toward the storage rack 34 inserting the horizontally extending support members 30 within the complementary open spaces of the horizontally spaced shelf members 40. When fully inserted, the carriage 26 is lowered into engagement with the upper-most workpiece supported on the shelf in response to appropriate signals by the control means 22. The control means 22, then activates the engaging members 32 to attach to the workpiece to be transferred. The carriage 26 is then raised slightly to lift the engaged workpiece from the stack supported by the shelf and the shuttle 16 is then sequentially, or simultaneously, moved along the fixed path of travel defined by the horizontally extending frame members or rails 14 of the frame structure 12. After reaching the laser cutter workstation position, the shuttle unit 16 is stopped in response to appropriate signals from the control means 22. The carriage 26 is then actuated to lower the engaged workpiece to the workpiece bed or support nest 36 of the laser cutter apparatus. After the workpiece is engaged with the workpiece bed or support nest 36, the control means 22 sends the appropriate signal to disengage the engaging members 32, ending the transport cycle. The carriage is then moved vertically away from the workpiece that has been transported, and sequentially or simultaneously, the shuttle 16 is operated to remove the conveyor away from the laser cutter workstation allowing the processing to begin.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An apparatus for conveying a plate to be laser cut comprising:

an overhead frame extending between a plate-storage location and a laser-cutting table location;

a shuttle supported by the overhead frame for movement along a path of travel between the plate-storage location and the laser-cutting table location, the shuttle including at least one vertically extending support member;

drive means operably connected between the frame and the shuttle for moving the shuttle along the path of travel;

a carriage supported on the vertically extending support member for movement between a raised position and a lowered position, the carriage including at least one plate-engaging member for releasibly supporting a plate to be transported along the path of travel;

lift means operably connected between the vertically extending support and the carriage for transporting the carriage vertically;

control means operably connected to the drive means for controlling movement of the shuttle along the path of travel; and a plurality of signal generators operably connected to the control means and positioned along the path of travel for indicating locations of the shuttle as the shuttle moves along the path of travel.

2. The apparatus of claim 1 further comprising:

control means operably connected to the lift means for controlling movement of the carriage vertically along the vertically extending support.

3. The apparatus of claim 1 wherein the drive means further comprises:

a reversible electric motor for driving the shuttle along the path of travel.

4. The apparatus of claim 1 wherein the lift means further comprises:

a reversible electric motor;

a storage spool connected to the motor for reversible rotation therewith; and at least one belt operably connected extending between the shuttle and the carriage, and extendable and retractable with respect to the storage spool in response to rotation of the reversible electric motor for raising and lowering the carriage along the vertically extending support.

5. The apparatus of claim 1 further comprising:

a storage rack located at the plate-storage location for storing a plurality of plates to be laser cut.

6. The apparatus of claim 5 wherein the storage rack supports a portion of the overhead frame.

7. The apparatus of claim 5 wherein the storage rack includes a plurality of vertically spaced shelves.

8. The apparatus of claim 7 wherein each shelf is defined by a plurality of horizontally spaced shelf members defining openings between one another at ends facing an approach by the carriage.

9. The apparatus of claim 8 wherein the carriage further comprises:

a plurality of horizontally extending support members, the support members engagable between and into the openings defined between the plurality of horizontally spaced shelf members of the storage rack.

10. The apparatus of claim 9 wherein the at least one plate-engaging member further comprises a plurality of plate-engaging members supported from the horizontally extending support members of the carriage permitting direct engagement with an upper-most plate in a stack supported by an underlying shelf of the storage rack.

11. An apparatus for conveying a plate to be laser cut comprising:

an overhead frame extending between a plate-storage location and a laser-cutting table location;

a shuttle supported by the overhead frame for movement along a path of travel between the plate-storage location and the laser-cutting table location, the shuttle including at least one vertically extending support member;

drive means operably connected between the frame and the shuttle for moving the shuttle along the path of travel;

a carriage supported on the vertically extending support member for movement between a raised position and a lowered position, the carriage including at least one plate-engaging member for releasably supporting a plate to be transported along the path of travel;

lift means operably connected between the vertically extending support and the carriage for transporting the carriage vertically;

control means operably connected to the lift means for controlling movement of the carriage vertically along the vertically extending support; and at least one signal generator operably connected to the lift means and positioned along the vertically extending support for indicating at least one location of the carriage as the carriage moves along the support.

12. An apparatus for conveying a plate to be laser cut comprising:

an overhead frame extending between a plate-storage location and a laser-cutting table location;

a shuttle supported by the overhead frame for movement along a path of travel between the plate-storage location and the laser-cutting table location, the shuttle including at least one vertically extending support member;

drive means operably connected between the frame and the shuttle for moving the shuttle along the path of travel;

a carriage supported on the vertically extending support member for movement between a raised position and a lowered position, the carriage including at least one plate-engaging member for releasably supporting a plate to be transported along the path of travel;

lift means operably connected between the vertically extending support and the carriage for transporting the carriage vertically;

control means operably connected to the drive means and the lift means for controlling horizontal and vertical components of movement of the shuttle along the path of travel; and a plurality of signal generators operably connected to the control means and positioned along the path of travel for indicating locations of the shuttle as the shuttle moves along the path of travel, and positioned along the vertically extending support for indicating at least one location of the carriage as the carriage moves along the support.

13. The apparatus of claim 12 wherein the drive means further comprises:

a reversible electric motor for driving the shuttle along the path of travel.

14. The apparatus of claim 12 wherein the lift means further comprises:

a reversible electric motor;

a storage spool connected to the motor for reversible rotation therewith; and at least one belt operably connected extending between the shuttle and the carriage, and extendable and retractable with respect to the storage spool in response to rotation of the reversible electric motor for raising and lowering the carriage along the vertically extending support.

15. The apparatus of claim 12 further comprising:

a storage rack located at the plate-storage location for storing a plurality of plates to be laser cut.

16. The apparatus of claim 15 wherein the storage rack supports a portion of the overhead frame.

17. The apparatus of claim 15 wherein the storage rack includes a plurality of vertically spaced shelves.

18. The apparatus of claim 17 wherein each shelf is defined by a plurality of horizontally spaced shelf members defining openings between one another at ends facing an approach by the carriage.

19. The apparatus of claim 18 wherein the carriage further comprises:

a plurality of horizontally extending support members, the support members engagable between and into the openings defined between the plurality of horizontally spaced shelf members of the storage rack.

20. The apparatus of claim 19 wherein the at least one plate-engaging member further comprises a plurality of plate-engaging members supported from the horizontally extending support members of the carriage permitting direct engagement with an upper-most plate in a stack supported by an underlying shelf of the storage rack.

* * * * *